United States Patent [19]
Vandling

[11] 4,244,007
[45] Jan. 6, 1981

[54] FACSIMILE RECEIVER SIGNALLING

[75] Inventor: John M. Vandling, Pleasantville, N.Y.

[73] Assignee: Exxon Research & Engineering Co., Florham Park, N.J.

[21] Appl. No.: 886,135

[22] Filed: Mar. 13, 1978

Related U.S. Application Data

[63] Continuation-in-part of Ser. No. 617,104, Sep. 26, 1975, Pat. No. 4,079,425.

[51] Int. Cl.³ .......................... H04N 1/32; H04N 1/34
[52] U.S. Cl. ................................................... 358/257
[58] Field of Search ............... 358/257, 264, 265, 267, 358/260

[56] References Cited
U.S. PATENT DOCUMENTS
4,000,371  12/1976  Ogawa ................................... 358/257

*Primary Examiner*—John C. Martin
*Attorney, Agent, or Firm*—Norman L. Norris

[57] ABSTRACT

The receiver of a facsimile system includes a modulator for generating a signal for transmission to a remote transmitting location to identify a characteristic of the receiver. The signal from the receiver varies between a first frequency which is contiguous with and immediately precedes a second frequency. By utilizing different first frequencies to characterize different types of receivers, the transmitter at the remote location is able to identify the type of receiver including, for example, the demodulating capabilities of the receiver.

19 Claims, 7 Drawing Figures

_Fig. 3_

_Fig. 4_

FACSIMILE RECEIVER SIGNALLING

RELATED INVENTIONS

This application is a continuation-in-part of copending application Ser. No. 617,104 filed Sept. 26, 1975, now U.S. Pat. No. 4,079,425.

BACKGROUND OF THE INVENTION

This invention relates to facsimile systems comprising a transmitter, a receiver and a communications network therebetween. More particularly, this invention relates to a system wherein a document is scanned in a facsimile transmitter to generate electrical information-bearing signals representing the dark-light variations in the document being scanned. These information-bearing signals are then transmitted over the communications network to a facsimile receiver where the information-bearing signals are converted to marks or images on a copy medium so as to form a copy which is a reasonable facsimile of the original document.

At the present time, facsimile transmitters and receivers are capable of operating in different transmission modes. For example, many facsimile transmitters and receivers in the United States facsimile market are capable of transmitting in 4 and 6-minute transmission modes. In order to signal the particular transmission mode to an unattended receiver such as the Model 410 manufactured by the Xerox Corporation, a signal is transmitted during the sync period from the transmitter having a frequency of approximately 1500 Hz. representing the synchronizing pulse for a 6-minute transmission mode and a signal of approximately 1250 Hz. is generated representing the synchronizing pulse for the 4-minute transmission mode. By providing a 15 second synchronizing period at the beginning of a transmission, it is possible for a receiver to detect the frequency of the synchronizing pulse and select the appropriate scanning rate before the document transmission begins. Typically the duration of the synchronizing pulse is constant and the occurrence of the pulse relative to the rotation of the facsimile drum clamp past the document photodetector is a function of the tolerance of the sync pulse generator.

In copending application Ser. No. 617,104 filed Sept. 26, 1975 and copending application Ser. No. 886,147 filed Mar. 13, 1978, both of which are assigned to the assignee of this invention, the synchronizing pulses are varied in frequency and duration as well as time lapse between synchronizing pulses to signal a plurality of transmission modes. This signalling is performed by the transmitter so as to advise the receiver of the type of mode being utilized in the transmission.

The Xerox 410 as well as Graphic Sciences DEX4300 also provide for signalling from a receiving unit to a transmitting unit to indicate a state of readiness to receive. Such a ready to receive signal which is oftentimes referred to as a handshake typically comprises a single frequency signal of relatively short duration which is transmitted from the receiver to the transmitter prior to the transmission of any information from the transmitter to the receiver. The function of the signal is to clearly indicate state of readiness of the receiver and there is no additional information provided by such as single frequency signal.

Where a transmitter is capable of different modes of transmission, some of which may be more desirable than others or particularly well suited to the document which forms the subject matter of the transmission, it becomes important for the transmitting unit to recognize the capability of the receiving unit. While this is oftentimes done by voice communication between operators at the transmitting unit and the receiving unit, such voice communication requires the full understanding of the operator at the receiving unit as to the capability of the receiving unit. Moreover, the communication can be time-consuming and prone to error especially when a receiving operator is required to preset the receiving unit to the correct combination of a number of possible operating modes. Of course where the receiving unit is an unattended machine, such voice communication is not possible.

Any signalling as to the capability of a receiving unit should be compatible with existing facsimile systems. In other words, ready to receive signals capable of indicating particular modes of operation at the receiver must distinguish over the ready to receive signals presently generated by certain existing facsimile equipment while at the same time distinguishing over the absence of any ready to receive signal which is characteristic of other facsimile equipment.

Any mode capability signalling the receiving unit must also be reliable. In this connection, the signalling must be noise immune so as to assure that the transmitting unit reliably detects the mode capability of the receiving unit. At the same time, it is desirable to provide this reliability without making the full bandwidth of the communication channel available to the transmitting unit for purposes of document transmission.

SUMMARY OF THE INVENTION

It is an overall object of this invention to provide a facsimile receiving unit with signalling for indicating the mode capabilities of the receiving unit to a remotely located transmitting unit.

It is further object of this invention to provide reliable mode capability signalling by the facsimile receiving unit.

It is a still further object of this invention to provide such a mode signalling capability for a receiving unit which is compatible with and distinguishable from the absence of such signalling by existing facsimile receiving units or the generation of ready to receive signals by existing facsimile receiving units.

It is a further object of this invention to provide signalling which may be recognized by an operator at the transmitting location as typical of ready-to-receive tones.

It is also an object of this invention to provide mode capability signalling from a facsimile receiving unit while making the full bandwidth available to the transmitting unit during the document transmission.

It is another object of this invention to provide signalling which may be expanded to indicate different and/or additional information.

It is a more specific object of this invention to provide for half duplex use of the communication channel to avoid unnecessary complexity in the terminal equipment.

It is a related object of this invention to utilize the increased reliability of a channel conditioned for half duplex operation as compared to the reliability of a channel conditioned for full duplex operation.

In accordance with these and other objects of the invention, a receiving unit in a preferred embodiment of the invention is adapted to reproduce dark-light variations in a copy representing a facsimile of a document located at a facsimile transmitter capable of transmitting in one of a plurality of modes. The receiving unit comprises writing means for reproducing dark-light variations in a document and demodulating means for demodulating received signals representing dark-light variations. In accordance with this invention, modulator means generate a transmission signal from the receiving unit representing the capability of the receiving unit to operate in at least one of the plurality of modes.

The transmission signal generated by the modulator means varies between a first frequency during a first interval and a second frequency during a second interval indicate the mode capability of the receiving unit. The first frequency may comprise one of a plurality of different frequencies, each of which identifies a particular mode capability. Preferably, the first frequency interval precedes and is contiguous with the second frequency interval and the duration of the first frequency interval is relatively short in comparison with the duration of the second frequency interval.

The modulator means is enabled prior to any transmission of information from the transmitting unit. When signals from the transmitting unit are detected by the receiving unit detector means, the modulator means is inhibited.

In the preferred embodiment of the invention, a facsimile transmitting unit comprises sensor means for detecting dark-light variations in a document and modulator means coupled to the sensor means for generating modulated transmission signals representing dark-light variations in a document. Demodulating means in the transmitting unit demodulate a received signal representing the capability of the receiving unit to operate in at least one of a plurality of modes. The transmitting unit further comprises means for generating a control signal representing the capability. In the preferred embodiment, the control signal is utilized to operate visual indicator means so as to advise the operator at the facsimile transmitting unit as to the various modes available for communication with the remotely located receiving unit. In addition or in the alternative, the control signal may be utilized to automatically select or enable a particular transmission mode(s) at the transmitting unit.

DETAILED DESCRIPTION OF A PREFERRED EMBODIMENT

Figure 1:
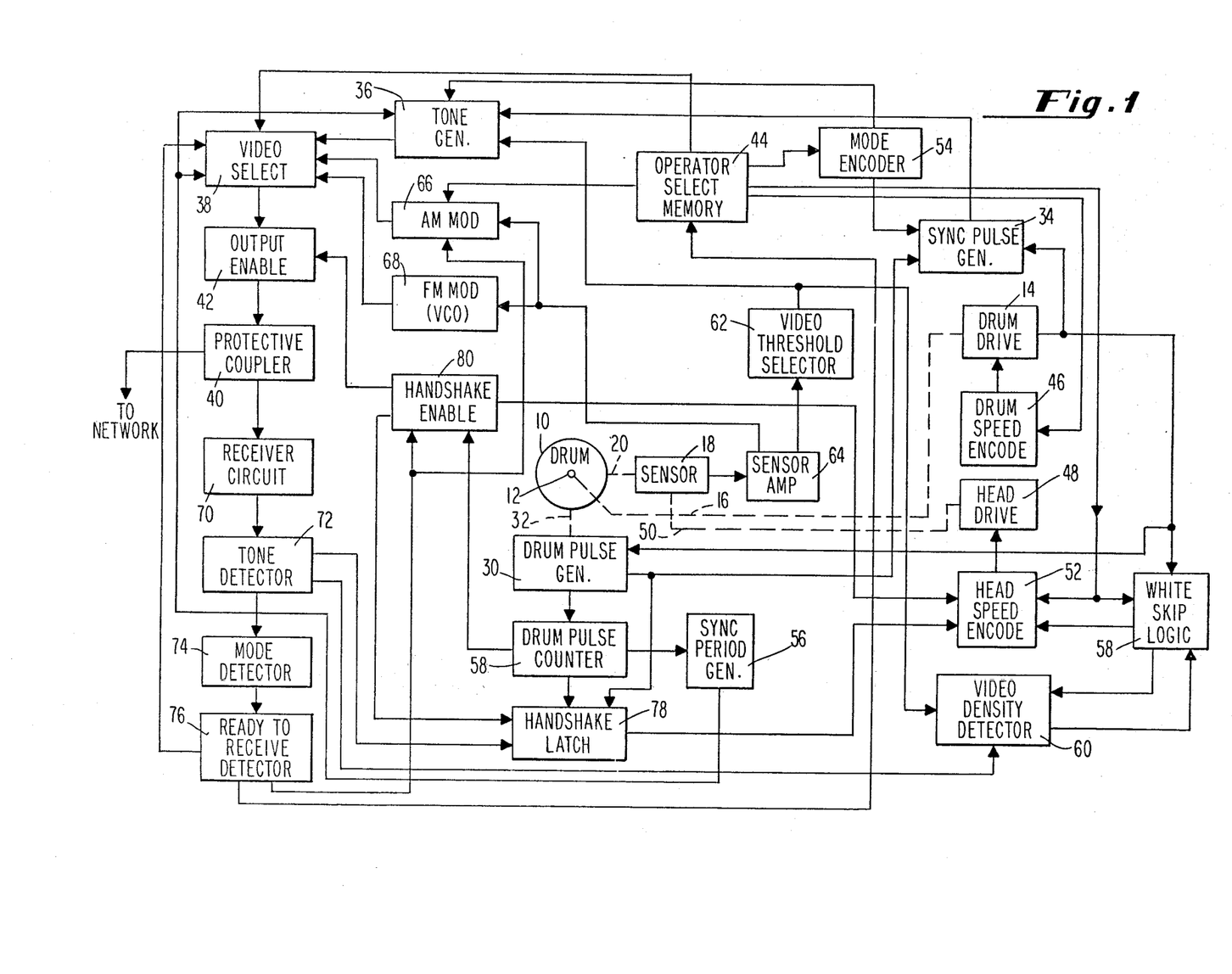
FIG. 1 is a schematic diagram of a facsimile transmitting unit of a preferred embodiment of the invention.

Referring to FIG. 1, the facsimile unit for transmitting signals representing dark-light variations in a document to a remote location is shown in block form. The document containing the dark-light variations is wrapped around a drum 10 which is rotated about its axis 12 by a drum drive 14 through a mechanical coupling depicted by a broken line 16.

A sensor 18 is juxtaposed to the surface of the drum 10 and the document carried thereon so as to optically communicate with the document and the dark-light variations thereon as depicted by a broken line 20.

Figure 1A:
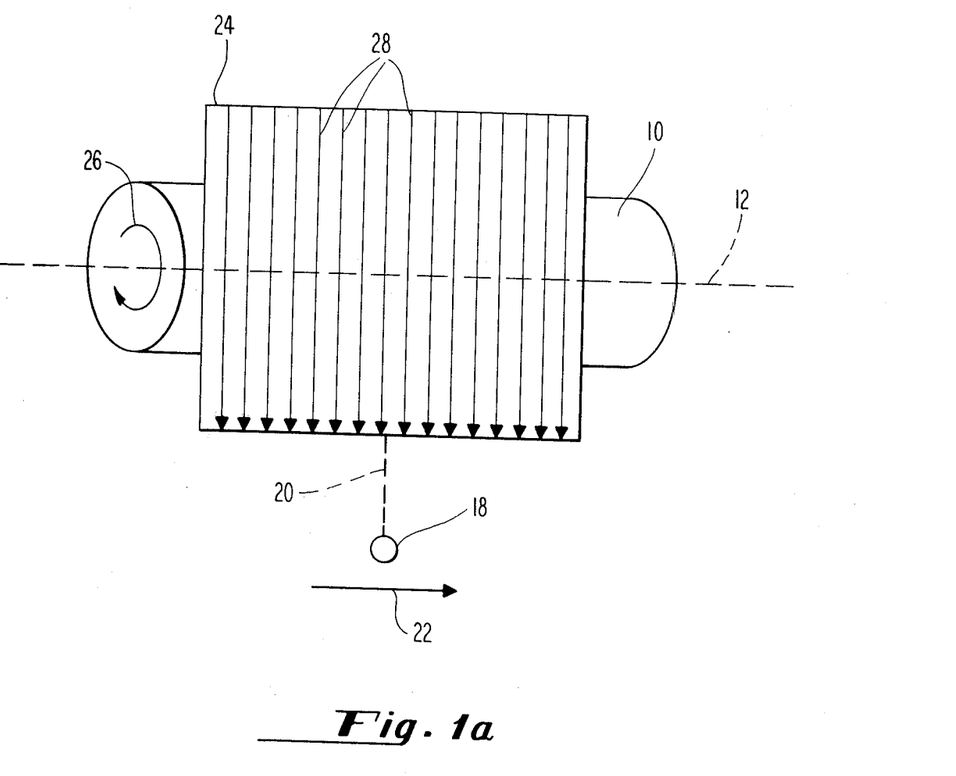
FIG. 1a is a schematic diagram illustrating the scanning of a document as the transmitter of FIG. 1.

Referring to FIG. 1a, the motion of the sensor 18 in a direction depicted by an arrow 22 generally parallel to the axis 12 of the drum 10 produces two orthogonal scanning motions of the sensor 18 relative to a document 24 which is adapted to be wrapped around the drum 10. More particularly, rotation of the drum 10 about the axis 12 in a direction depicted by an arrow 26 produces a plurality of side-by-side scan lines 28 which traverse the document 24 from one edge to an opposing edge in one orthogonal direction while the sensor 18 is advanced in the direction 22 so as to traverse the document 24 from another edge to an opposing edge in the other of the orthogonal directions.

As the drum 10 rotates, a drum pulse generator 30 receiving a tachometric (hereinafter —tach—) signal from the drum drive 14 is coupled to the drum 10 as depicted by a broken line 32 produces a pulse for each rotation of the drum 10 about the axis 12. The output from the drum pulse generator 30 is applied to a sync pulse generator 34 to generate a sync pulse representing a predetermined relationship between the position of the drum 10 relative to the sensor 18, and more particularly, the position of the opposing edges of the document 24 which extend parallel with the axis of the drum 12 relative to the sensor 18.

In accordance with the invention of copending application Ser. No. 886,147 filed Mar. 13, 1978, assigned to the assignee of this invention and incorporated herein by reference, the drum pulses from the drum pulse generator 30 are coupled to the sync pulse generator 34 so as to produce a time lapse between sync pulses which corresponds to a particular scanning rate of the drum 10 which is characteristic of a particular mode of operation for the transmitter. The sync pulses from the sync pulse generator 34 are then applied to a tone generator 36 to produce frequency modulated signals representing the sync pulses and the time lapse between sync pulses. The output from the tone generator 36 is then applied a video select circuitry 38 under the control of an operator select memory 44. A protective telephone coupler circuit 40 applies frequency modulated synchronizing signals representing a particular scanning mode for the transmitter to the telephone network or other communications link in response to and under the control of an output enable circuit 42 coupled between the protective coupler 40 and the video select circuit 38. The time lapse between synchronizing pulses is under the control of the operator select memory 44 which is coupled to a drum speed encode circuit 46. The output of the drum speed encode circuit 46 is in turn coupled to the drum drive 14 so as to control the tachometric signal applied to the sync pulse generator 34 from the output of the drum drive 14 and the drum pulse generator 30 and thus the time lapse between sync pulses.

As also shown in FIG. 1, the sensor 18 is coupled to a head drive 48 as depicted by a broken line 50. The head drive 48 produces the motion depicted by the arrow 22 shown in FIG. 1a. The particular speed of the sensor 20 as determined by the head drive 48 is under the control of head speed encode circuitry 52 which is coupled to the operator select memory 44 so as to permit the operator to actually select the head speed depending upon the particular scanning mode chosen.

In accordance with another important aspect of the aforesaid application Ser. No. 886,147 filed Mar. 13, 1978 the time lapse between the sync pulses produced by the generator 34 may also represent the scanning rate in the direction 22 as shown in FIG. 1a. In this regard, it will be understood that the particular drum speed in the direction of rotation 26 as shown in FIG. 1a may be chosen to correspond with particular head speeds in the direction 22 so that a time lapse between sync pulses will indicate the scanning rate in each of two orthogonal directions. Accordingly, information is transmitted from the transmitter via the coupler 40 which signals the scanning rate mode in each of two orthogonal scanning directions.

Mode signalling from the transmitter is also accomplished by varying the duration of the sync pulses as well as the time lapse between sync pulses. In this connection, a mode encoder 54 is provided which is coupled to the operator select memory 44 and the sync pulse generator 34. The operator may therefore select a particular synchronizing pulse width to signal a particular mode. Different synchronizing pulse widths may be utilized to signal two different modes having the same drum speed but differing head speeds.

The frequencies of the synchronizing signals including the pulses and the time lapse between pulses are selected and controlled so as to signal particular transmission modes. This is accomplished by the mode encoder 54 which is also coupled to the tone generator 36 so as to produce selected tones or frequencies in response to the output from the sync pulse generator 34 during the synchronizing period. In the preferred embodiment of the invention, the specific single frequencies of the synchronizing signals are utilized to identify a particular mode wherein a particular bandwidth is utilized to transmit the dark-light information after the synchronizing period has been completed as determined by a sync period generator 56 coupled to the output of a drum pulse counter 58 which receives a pulse for each revolution of the drum 10.

The frequencies of the synchronizing signals are also utilized to signal a particular transmission time compression mode. In this particular mode, areas of the document having little or no video information are scanned at faster scanning rates under the control of white skip logic circuitry 58 which is coupled to the head speed encode circuit 52 and the operator select memory 44. When operating in this time compression mode, a high speed enable signal is applied from the white skip logic circuit 58 to a video density detector 60 which determines the density of video or black information on the document. To accomplish this purpose, the video density detector 60 is coupled to a threshold detector 62 which is responsive to the output of a sensor amplifier 64 connected to the sensor 18. The video threshold detector is coupled to the tone generator 36. The output from the video density detector 60 is applied to the white skip logic 58 to indicate low video or dark information density. The white skip logic 58 then signals the high speed encode circuit 52 to speed up the head drive. On the other hand, when the video or black information density increases, the output from the video density detector supplied to the white skip logic 58 reduces the head drive 48 under the control of the head speed encode circuit 52.

The frequency of the synchronizing signals may also be utilized to signal a mode wherein a particular modulation scheme is utilized. In accordance with this aspect of the invention, the transmitter of FIG. 1 includes an AM modulator 66 coupled to the video select circuit 38 and the sensor amplifier 64. The operator select memory 44 is coupled to and capable of activating the AM modulator circuit 66.

As noted previously, the frequency of the synchronizing signals may be utilized to signal the particular bandwidth of a transmission mode. In this connection, it will be noted that an FM modulator 68 in the form of a VCO coupled to the sensor amplifier 64 is provided in addition to the tone generator 36. The FM modulator 68 which is coupled to the video select circuit 38 is capable of providing a relatively large number of gray scale levels of relatively broad bandwidth as compared to the two level (black and white) tone generator 36. In other words, the tone generator 36 when transmitting dark-light information merely transmits black or white in response to the output of the video threshold detector 62 whereas the modulator 68 is capable of providing a gray scale in a broader bandwidth in response to the output of the sensor amplifier 64.

In accordance with this invention, the transmitter of FIG. 1 includes detector means for demodulating a ready-to-receive signal originating from and identifying the mode capabilities of a remotely located receiving unit. The detector means includes a receiver circuit 70 having an input coupled to the protective coupler 40 and an output coupled to a tone detector 72. The tone detector 72 is in turn coupled to a mode detector 74 having an output coupled to a ready to receive tone detector 76 which identifies the mode capabilities of the remotely located receiving unit. The output from the ready to receive tone detector 76 is coupled to the video select circuit 38, the operator select circuit 44 as well as the AM modulator 66 so as to permit the selection of AM modulation for transmitting the dark-light information should that be the choice of the operator of the sending unit.

In accordance with the invention of copending application Ser. No. 886,136 filed Mar. 13, 1978, assigned to the assignee of this invention and incorporated herein by reference, the detector means including the tone detector 72 demodulates handshake signals transmitted from a receiving unit during predetermined intervals when the transmission signals representing dark-light variations in a document are absent. The output from the tone detector 72 is then applied to a handshake latch 78 and an output from the ready to receive tone detector 76 is applied to a handshake circuit 80 when the detector 76 detects a receiving unit capable of generating handshake signals. The handshake signals are utilized to advise the transmitter that the receiver is still receiving information from the transmitter. The latch 78 is coupled to the head speed encoder 52 so as to permit a transmission to be aborted should a handshake signal fail to arrive within a predetermined interval at the handshake latch 78. The head drive 48 may then be returned automatically to the start position. The particular intervals are determined at the handshake latch 78 in response to an output from the drum pulse counter 58. The counter 58 is also coupled to the handshake enable circuit 80. The handshake enable circuit 80 also enables the output enable circuit 42. Strobing of the handshake latch 78 at predetermined intervals to determine if the tone detector has detected a handshake signal is accomplished by the output of the drum pulse generator 30.

In order to avoid missing the transmission of any dark-light information during the handshake, it is necessary to inhibit the motion of the head drive in the transmitting and receiving units during the same predetermined interval. In this connection, the head speed encode circuit 52 is connected to the handshake enable circuit 80 so as to assure that the sensor motion and head drive will be inhibited during the predetermined interval as determined by the drum pulse counter 58.

Figure 2:
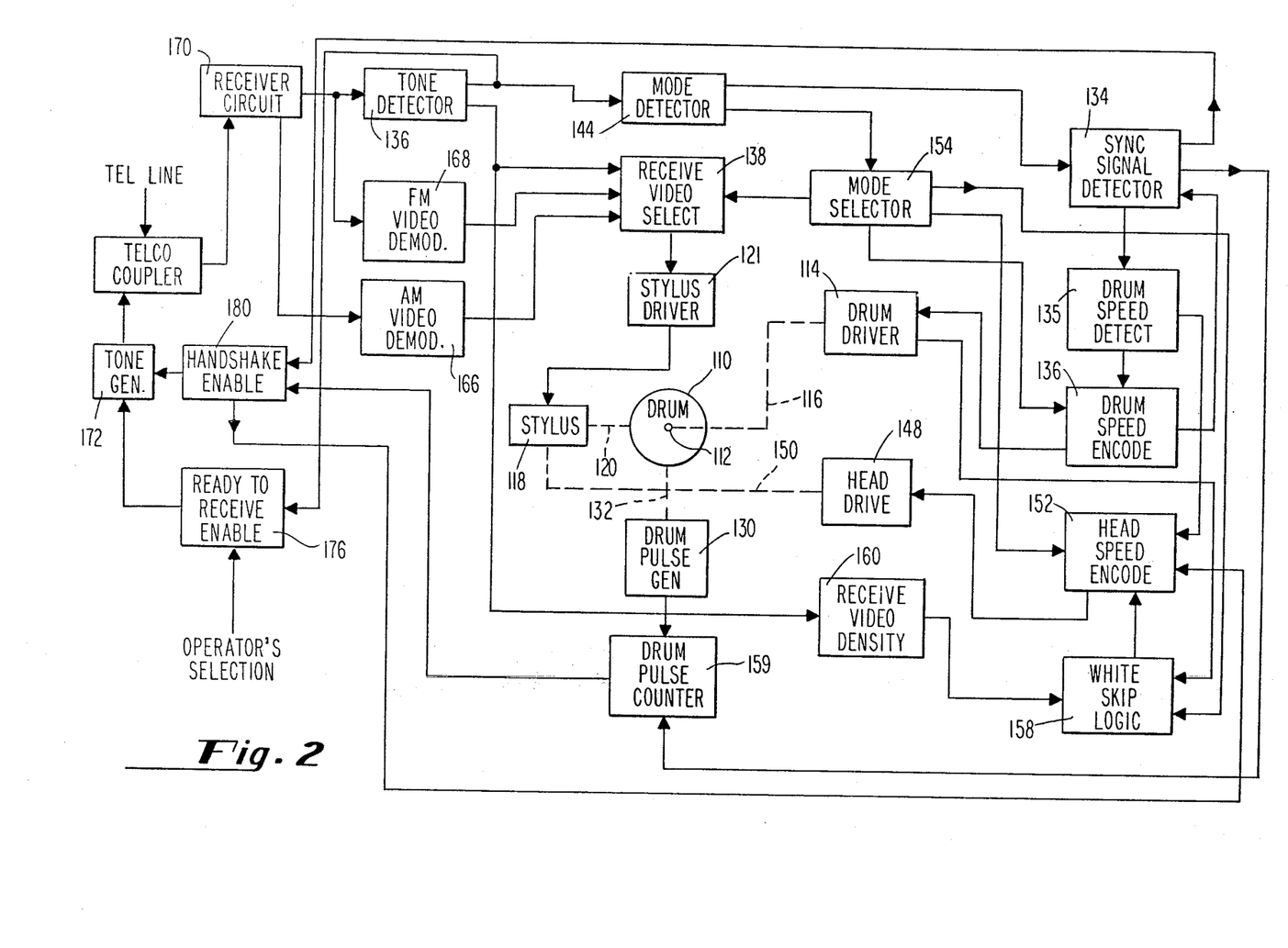
FIG. 2 is a schematic diagram of a facsimile receiving unit of the preferred embodiment of the invention.

Reference will now be made to FIG. 2 wherein a facsimile unit for reproducing dark-light variations on a copy medium in response to received signals from a remote location is shown. The receiving facsimile unit comprises a drum 110 adapted to rotate about an axis 112. The drum 110 is rotated about the axis 112 by a drum drive 114 which is coupled to the drum 110 as depicted by the line 116.

A writing means such as a stylus 118 is coupled to the copy medium carried on the drum 110 as depicted by the broken line 120. The stylus 118 is coupled to a stylus driver 121 which is responsive to the receive video select circuit 138.

For the sake of simplicity, the scanning motion with respect to the copy medium carried by the drum 110 will not be described in detail. It will however be understood that the scanning motion is identical to that described with reference to the document shown in FIG. 1a except that the stylus 118 moves parallel to the axis of the drum 110 rather than the sensor. The motion of the stylus 118 is provided by a head drive 148 which is coupled to a head carrying the stylus 118 as depicted by the broken line 150.

In accordance with this invention, the receiving unit comprises a mode detector 144 coupled to the output of a tone detector 136. The mode detector in conjunction with a mode selector 154, a sync signal detector 134 and a drum speed detect circuit 135 are capable of establishing a mode of operation at the receiver responsive to the particular transmitter mode as detected by the mode detector 144.

More particularly, the sync signal detector 134 and the drum speed detect circuit 135 are capable of determining the time lapse between the synchronizing signals received from the transmitter to establish the appropriate scanning rates for both orthogonal scanning directions at the drum 110. In this connection, the drum speed detect circuit 135 is coupled to both the drum speed encode circuit 126 as well as the head speed encode circuit 152.

The mode selector circuit 154 is also capable of activating the white skip logic circuitry 158 which is coupled to the head speed encode circuit 152. The white skip logic circuit 158 is responsive to the output from the receive video density 160 which is coupled to the tone detector 136 as well as tach signals from the drum drive 114. The output from the white skip logic 158 is applied to the head speed encode 152 to appropriately increase and decrease the scanning rate of the stylus 118 parallel to the axis of the drum 110 in response to the video or black information density received by the receiver circuit 170. In controlling the white skip logic and in accordance with one important aspect of the invention, the mode selector 154 is responsive to the frequencies of the synchronizing signals.

The mode selector 154 is responsive to the duration of the sync pulses in the synchronizing signal to control the scanning rate of the stylus 118. In this connection, the output from the mode selector 154 is applied to the head speed encode 152.

The mode selector 154 is also responsive to the frequencies of the synchronizing signal to place the receiver in a particular mode for receiving a particular type of modulation, i.e., FM or AM, or receiving FM in a particular bandwidth. In this connection, the receive video select circuit 138 is coupled to the output of the mode selector 154 to select one of a plurality of outputs from various detectors including the tone detector 136 which detects a narrow bandwidth FM, an FM video detector 168 which detects a wider bandwidth and an AM video detector 166.

In accordance with this invention, the receiving unit includes a tone generator 172 for generating tones in response to a ready to receive enable circuit 176 so as to identify the mode capabilities of the receiving unit. The ready to receive tone is activated by an operator prepared to receive a facsimile document. Through the generation of appropriate tones, the capability of the receiving unit with respect to AM and FM demodulation and/or white skip logic may be identified by the transmitting unit described with reference to FIG. 1. The ready to receive enable circuit is coupled to the output of the tone detector 136 so as to permit the circuit 176 to be inhibited on receiving a predetermined signal from the transmitter.

In accordance with the invention of the aforesaid copending application Ser. No. 886,136, filed Mar. 13, 1978 the receiving unit also includes a handshake enable circuit 180 which is coupled to the tone generator 172. The handshake signal from the handshake enable circuit 180 is generated at predetermined intervals as determined by a drum pulse counter 159 coupled to the output of a drum pulse generator 130. The drum pulse generator 130 is coupled to the drum as depicted by the broken line 132. The handshake enable circuit is only enabled in the receiving unit when the sync signal detector 134 has indicated that a compatible sync signal has been detected. The handshake enable circuit 180 is coupled to the head speed encode circuit 152 to inhibit the head drive during the handshake period.

Figure 3:
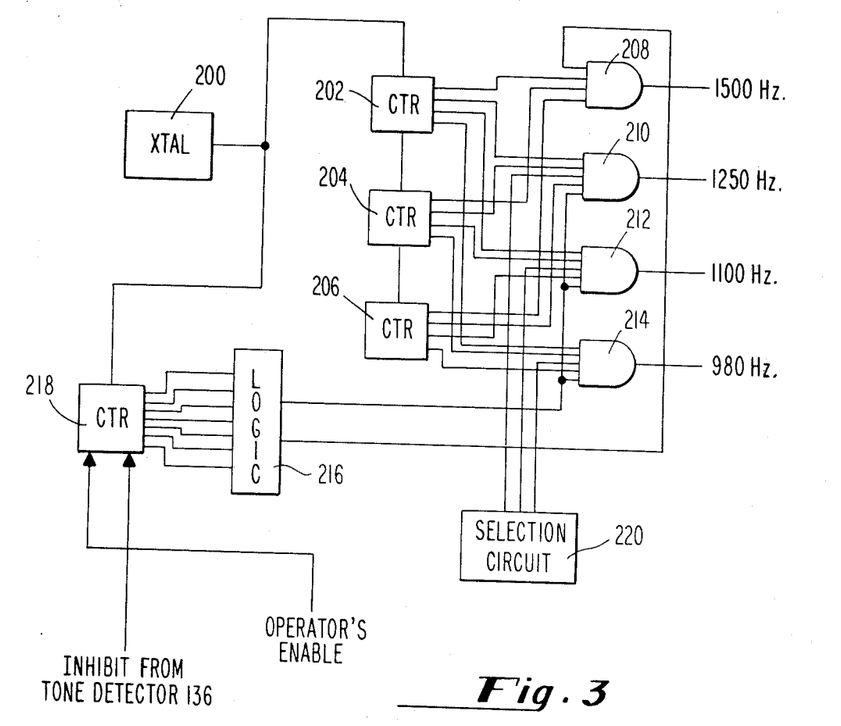
FIG. 3 is a schematic diagram of the tone generator and ready to receive enable circuitry shown in FIG. 2.

In accordance with this invention, the tone generator 172 shown in FIG. 2 is capable of generating frequency modulated signals, more particularly frequency shift keyed signals (fsk), representing the capability of the receiving unit to operate in at least one of a plurality of modes. More specifically, the tone generator 172 as shown in FIG. 3 is capable of generating pulses comprising 1500 Hz., 1250 Hz., 1100 Hz. or 980 Hz. tones as shown in FIG. 4.

Figure 4:
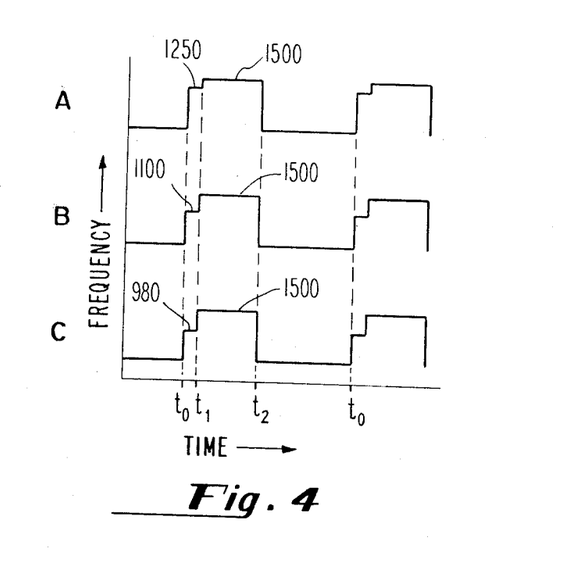
FIG. 4 is a waveform showing the mode capability signals generated by the tone generator of FIGS. 2 and 3.

Referring to waveform a of FIG. 4, a pulse is generated comprising a first frequency during a first interval of 1250 Hz. forming a front porch to a second frequency during a second interval of 1500 Hz. The particular transitions between silence and 1250 Hz; between 1250 Hz and 1500 Hz. and between 1500 Hz and silence represent a particular mode capability. Similarly, waveform b of FIG. 4 represents a pulse comprising 1100 Hz. first frequency for the front porch followed by a 1500 Hz. frequency. Waveform c of FIG. 4 comprises a 980 Hz. front porch frequency followed by 1500 Hz. It will therefore be understood that the amplitude of the front porch in waveforms a–c of FIG. 4 represent frequency.

Referring again to FIG. 3, a specific circuit capable of generating these pulses comprising plural frequencies will now be described. A crystal controlled source 200 of clock pulses is coupled to a chain of counters 202, 204 and 206. Selected outputs from the counters 202, 204, 206 are applied to AND gates 208, 210, 212 and 214 to generate the 1500 Hz., 1250 Hz., 1100 Hz., and 980 Hz. tones for selected durations so as to generate the pulses of FIG. 4 in response to enabling by a logic selector circuit 216 coupled to the output of a counter 218.

The counter 218 which is coupled to the crystal 200 is enabled in response to an operator's enable signal which may correspond, for example, to closing a cover on the receiving unit at time $t_0$ in FIG. 4. The counter 218 provides the relatively slow on/off control of the ready to receive tone providing periods of silence between times $t_2$ and $t_0$. The counter 218 also controls the duration of the first and second frequencies of the ready to receive tone. At time $t_0$, the logic selector circuit 216 applied enable signals to AND gates 210, 212 and 214 corresponding to 1250, 1100 and 980 Hz. respectively. The actual frequencies used are a function of receiver capabilities and are thus hardware in the logic of the circuit 46 and determines which one of the AND gates 210, 212 and 214 will be enabled.

At time $t_1$, the selectively enabled AND gate 210 or 212 or 214 is inhibited by the output of the logic selector 216 in response to the counter 218 and the AND gate 208 is enabled so as to generate a 1500 Hz. signal until time $t_2$. If the tone detector 136 shown in FIG. 2 detects a signal of predetermined frequency during the silent period between the pulses of FIG. 4, counter 218 is latched in a reset condition and the generation of the pulses of FIG. 4 is terminated. Such a reset inhibit signal may be generated from the tone detector 136 when certain frequencies are detected, for example, 2400 Hz. repesenting one of the frequencies always present in a transmitted synchronizing signal.

It will therefore be understood with reference to FIGS. 3 and 4, that certain frequency transitions are generated so as to represent a particular mode capability of the receiving unit. It has been found that the use of transitions of frequencies is particularly reliable from a noise immunity standpoint as well as distinguishing from prior art ready-to-receive tones generated by some facsimile transceivers. As shown in FIG. 4, the front porch represented by the lower frequencies existing between times $t_0$ and $t_1$ is relatively short as compared with the duration of the 1500 Hz. signal from time $t_1$ to $t_2$. For example, the lower frequency front porch may have a duration of approximately 15 msec. as compared with a 480 msec. duration between times $t_1$ and $t_2$. It will of course be appreciated, that the same reliability could also be achieved by a back porch where the lower frequency of 1250, 1100 or 980 Hz. or other suitable frequency is contiguous with and immediately follows the 1500 Hz. frequency so as to form a back porch.

In accordance with this invention, it is necessary that the transitions in the pulses generated at the receiving unit are reliably detected at the transmitting unit. In this connection, it is desirable to utilize a tone detector 72 and a mode detector 74 of the type described in detail in copending application Ser. No. 886,147 filed Mar. 13, 1978.

As disclosed therein, the tone detector 72 may comprise a single shot multi-vibrator which is triggered by the output from the receiver circuit 70 so as to generate a brief pulse at the leading edge of the square wave of relatively short duration as compared with the duration of the square wave. The brief pulse from the single shot is utilized to initiate counting in a counter coupled to a crystal source so as to count the number of crystal controlled pulses between single shot pulses where the count is inversely proportional to the frequency or tone of the square wave signals from the receiver circuit 70. A decoder may be coupled to the counter so as to produce a plurality of decoded outputs corresponding to frequency transition. Additional registers may be provided to compare a decoded output with a previous decoded output and produce an output from the tone detector only when the same frequency transition has been detected a predetermined number of times.

Figure 5:
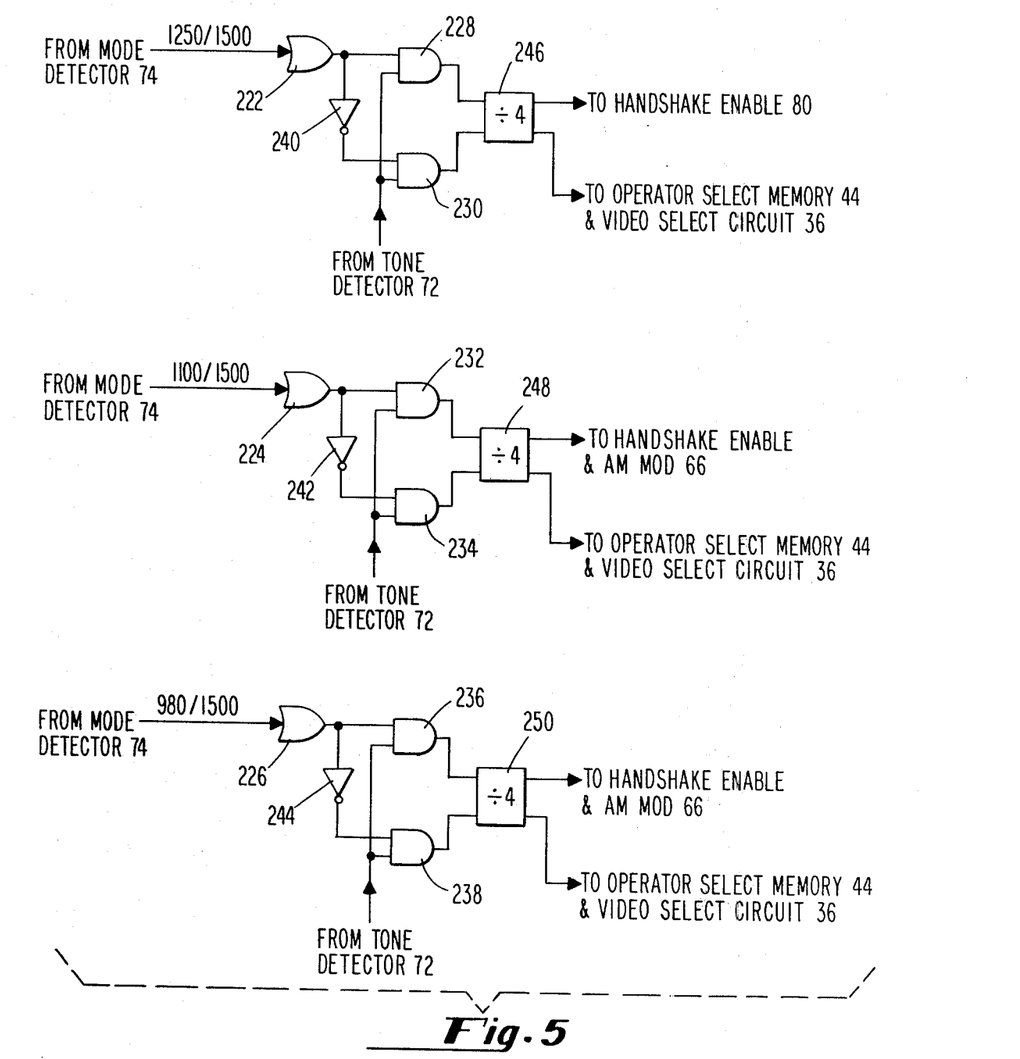
FIG. 5 is a schematic diagram of the ready to receive tone detector of FIG. 1.

The motor detector 74 may comprise gating which is coupled to the tone detector 72. When a recognized frequency transition is detected, a gate is enabled corresponding to a particular mode thus defining the mode of operation. It will be understood that the gating circuitry of the mode detector 74 will produce an output corresponding to one of the three transitions of interest representing the mode capability of the receiving unit. More particularly, the gating circuitry of the mode detector 74 will generate a 1250/1500 Hz. pulse or 1100/1500 Hz. pulse or a 980/1500 Hz. pulse depending upon the capability of the receiving unit and these pulses will be applied to OR gates 222, 224 and 226 of the mode detector 76, as shown in FIG. 5. The outputs of the OR gates 222, 224 and 226 are connected to AND gate pairs 228 and 230, 232, 234 and 236 and 238. The outputs from the AND gates 222, 224 and 226 are applied to the AND gates 230, 234 and 238 through inverters 240, 242 and 244 respectively. The outputs of the AND gates 228 and 230, AND gates 232 and 234 and AND gates 236 and 238 are applied to the divide-by-four counters 246, 248 and 260 respectively.

After a valid transition has been detected and the tone detector 72 applies a clock pulse to one of the counters 246, 248 and 250 indicating a valid transition has been detected, the count of one of the counters 246, 248 and 260 associated with a predetermined frequency transition is advanced by one count. After four such pulses from the detector 72 have been received, one of the counters 246, 248 and 250 will latch and produce a signal to enable the handshake circuitry 80 and, in the case of counters 248 and 250, will apply an enabling signal to the AM modulator 66 shown in FIG. 1 to permit an operator selection of an AM or FM type of modulation. In addition, the counters 246, 248 and 250 generate an appropriate signal which is applied to the operator select memory 44 and the video select circuit 36 to store and/or utilize the mode capability information from the receiver.

If the output of the OR gates 222, 224 and 226 should go low before the counts 246, 248 and 250 produce an output signal, the AND gates 230, 234 and 238 will be enabled after the detector of a valid tone from the tone detector 72 so as to enable the gates 230, 234 and 238 and thereby reset the counters 246, 248 and 250 respectively. In this manner, reliable detection of the signal representing the mode capability of the receiver is achieved while ignoring transitions not intended to signal receiver mode capabilities.

Figure 6:
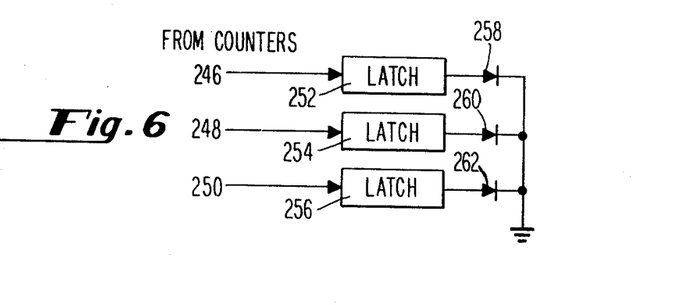
FIG. 6 is a schematic diagram of the operator select memory of FIG. 1.

Reference will now be made to FIG. 6 for a discussion of the operator select memory 44. Each of the outputs of the counters 246, 248 and 250 is applied to latches 252, 254 and 256 of the memory 44 respectively as shown in FIG. 6. The latches 252, 254 and 256 are coupled to LED's 258, 260 and 262 so as to provide a visual indication of the particular mode capability of the receiver which is stored for a predetermined length of time in the operator select memory 44. It will be understood that the signals produced by the mode detector 76 at the transmitter represents the mode capabilities of the receiver and may also be utilized to control the mode of the transmitter by, for example, automatic selecting the AM modulator circuit 66 shown in FIGS. 1 and 5 in the event that one of the counters 248 and 250 of FIG. 5 produce an enabling signal for the AM modulator 66. Similarly, control at the transmitter is provided by the mode capability signals transmitter from the receiver to enable the handshake enable circuitry 80 shown in FIG. 1 which forms the subject matter of copending application Ser. No. 886,136 filed Mar. 13, 1978.

In the foregoing specification, pulses which are transmitted from a facsimile receiving unit are generated which comprise a first frequency during a first interval which immediately precedes or is contiguous with a second frequency during a second interval so as to indicate the particular mode capability of the receiving unit. The first frequency has been varied and made relatively short in duration so as to form an information-bearing front porch on the second frequency. However, it will be appreciated that the second frequency may be relatively short as compared with the first frequency and may be varied so as to form an information-bearing back porch on the first frequency.

In the preferred embodiment, specific capabilities of the receiving unit have been indicated by the mode indicating signals, i.e., presence or absence of AM capability, type of AM capability and presence and absence of white skip capability. It will of course be understood that other receiver mode capabilities may be indicated by the facsimile receiving unit.

Although a particular embodiment of the invention has been shown and described and various alternatives suggested, it will be understood that other modifications and alternatives will fall within the true spirit and scope of the invention as set forth in the appended claims.

What is claimed is:

1. A receiving facsimile unit adapted to reproduce dark-light variations in a copy representing a facsimile of a document located at a facsimile transmitter capable of transmitting in one of a plurality of modes comprising:
   writing means for reproducing dark-light variations in a document;
   demodulating means for demodulating received signals including signals repesenting said dark-light variations, said detector means being coupled to said writing means; and
   modulator means for generating a transmission signal representing a capability of said receiving unit to operate in at least one of said modes, said signal sequentially varying between a first frequency during a first time interval and a second frequency during a second time interval so as to produce a frequency transition defining said mode capability.

2. The facsimile unit of claim 1 wherein said first frequency may comprise one of a plurality of different frequencies, each of said different frequencies identifying a particular type of unit.

3. The facsimile unit of claim 2 wherein said transmission signal identifies the demodulation capability.

4. The facsimile unit of claim 2 wherein said first time interval is contiguous with said second time interval.

5. The facsimile unit of claim 4 wherein said first frequency precedes said second frequency.

6. The facsimile unit of claim 5 wherein said first frequency immediately precedes said second frequency.

7. The facsimile unit of claim 6 wherein the duration of said first time interval is short relative to the duration of said second time interval.

8. The facsimile unit of claim 7 wherein said modulator means is inhibited in response to the detection of a signal by said demodulating means.

9. The facsimile unit of claim 1 wherein said second frequency is followed by a silent period.

10. A facsimile unit for transmitting signals representing dark-light variations in a document to a remotely located receiving unit which reproduces a facsimile of said document comprising:
    sensor means for detecting dark-light variations in a document;
    modulator means coupled to said sensor means for generating modulated transmission signals representing dark-light variations in a document;
    demodulating means for demodulating a received signal representing a capability of said receiving unit to operate in at least one of a plurality of modes, said signal sequentially varying between a first frequency during a first time interval and a second frequency during a second time interval so as to provide a frequency transition defining said mode capability; and
    means for generating a control signal representing said transition and said capability.

11. The facsimile unit of claim 10 wherein said received signal repesents a demodulation capability of said receiving unit.

12. The facsimile unit of claim 10 wherein said first frequency may comprise one of a plurality of different frequencies, each of said different frequencies representing different receiving unit capabilities.

13. The facsimile unit of claim 10 wherein said first frequency is contiguous with said second frequency.

14. The facsimile unit of claim 10 wherein said first frequency precedes said second frequency.

15. The facsimile unit of claim 10 wherein said first interval immediately precedes said second interval.

16. The facsimile unit of claim 10 wherein the duration of said first interval is short relative to the duration of said second interval.

17. The facsimile unit of claim 10 including control means enabled by said control signal.

18. The facsimile unit of claim 10 including indicator means enabled by said control signal.

19. The facsimile unit of claim 10 wherein said demodulating means detects said received signal varying between said first frequency and said second frequency, said second frequency being followed by a silent period.

* * * * *